United States Patent
Sugano

(10) Patent No.: US 8,893,427 B2
(45) Date of Patent: Nov. 25, 2014

(54) FISHHOOK AND METHOD FOR MANUFACTURING SAME

(75) Inventor: Akio Sugano, Hyogo (JP)

(73) Assignee: Gamakatsu Co., Ltd., Hyogo (IT)

( * ) Notice: Subject to any disclaimer, the term of this patent is extended or adjusted under 35 U.S.C. 154(b) by 179 days.

(21) Appl. No.: 13/640,443

(22) PCT Filed: Apr. 5, 2011

(86) PCT No.: PCT/JP2011/058579
§ 371 (c)(1),
(2), (4) Date: Oct. 10, 2012

(87) PCT Pub. No.: WO2011/129225
PCT Pub. Date: Oct. 20, 2011

(65) Prior Publication Data
US 2013/0025181 A1    Jan. 31, 2013

(30) Foreign Application Priority Data
Apr. 12, 2010   (JP) ................................ 2010-091330

(51) Int. Cl.
*A01K 83/00*      (2006.01)

(52) U.S. Cl.
CPC ...................................... *A01K 83/00* (2013.01)
USPC ............................................... 43/43.16; 29/9

(58) Field of Classification Search
CPC ................................ A01K 83/00; B21F 45/12
USPC ............................................... 43/43.16; 29/9
See application file for complete search history.

(56) References Cited

U.S. PATENT DOCUMENTS

| | | | | |
|---|---|---|---|---|
| 4,543,742 A | * | 10/1985 | Rand, Jr. | 43/43.16 |
| 5,024,020 A | * | 6/1991 | Sitton | 43/43.16 |
| 6,085,457 A | | 7/2000 | Kishida | |
| 2001/0025446 A1 | | 10/2001 | Asada | |
| 2005/0076557 A1 | * | 4/2005 | Fujii | 43/43.16 |

FOREIGN PATENT DOCUMENTS

| | | | |
|---|---|---|---|
| GB | 2158683 A | | 11/1985 |
| JP | 60255227 A | * | 12/1985 |
| JP | 2001028968 A | | 5/1999 |
| JP | 2009044973 A | | 8/2007 |
| WO | WO 9706673 A1 | * | 2/1997 |

* cited by examiner

*Primary Examiner* — Kimberly Berona
(74) *Attorney, Agent, or Firm* — R. Neil Sudol; Henry D. Coleman

(57) ABSTRACT

An inexpensive fishhook and a method for manufacturing the same whereby a piece of bait can be put as far as an end part of the chimoto side. An upper part of a shank (2) of a fishhook (1) is hit to form a flat surface (3) thereon, and a hole (4) penetrating through the flat surface (3) is formed at two points with a vertical interval therebetween. A part of the shank (2) is cut transversely across an upper hole (4a) of the holes to thereby form, at the upper part of the shank (2), a hole (4b) through which a fishing line (5) is passed and tied, and two upward protrusions (7) enabling a piece of bait to be engaged therewith and being capable of preventing the fastened fish line from being displaced from the upper part of the shank.

3 Claims, 5 Drawing Sheets

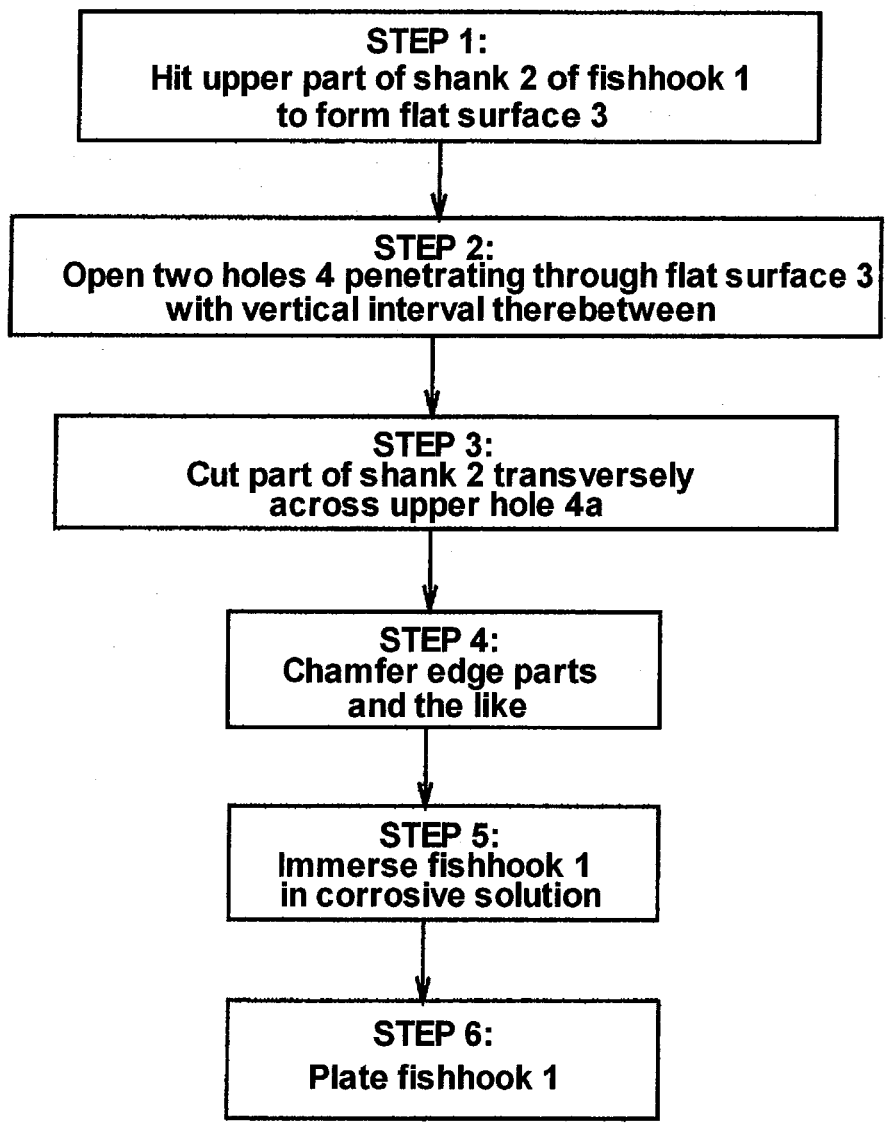

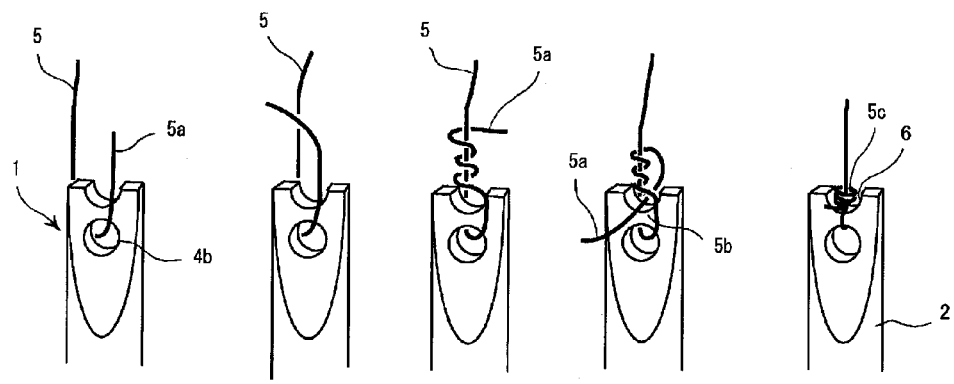
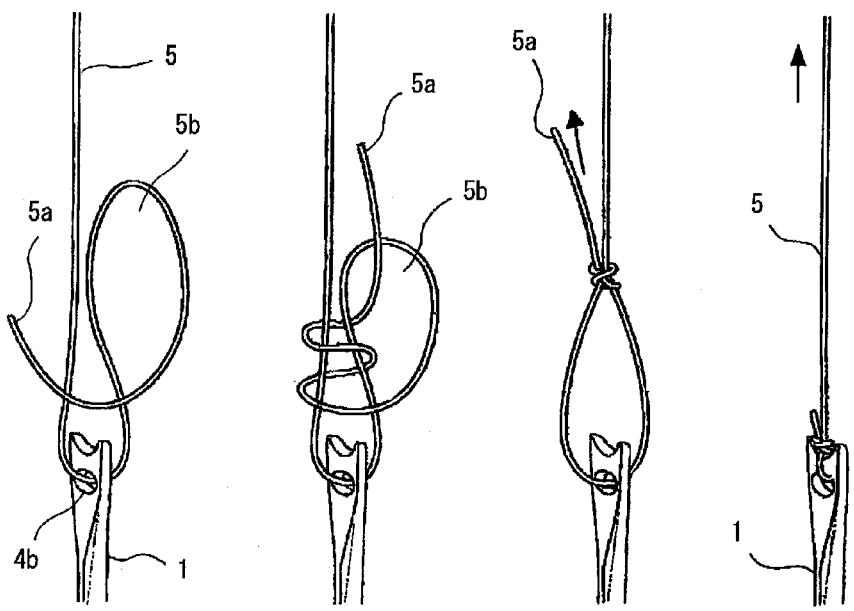

PRIOR ART

FISHHOOK AND METHOD FOR MANUFACTURING SAME

TECHNICAL FIELD

The claimed invention relates to a fishhook lacking a wide spade-end at an end part on the hook eye side, and relates also to a method for manufacturing the same.

BACKGROUND ART

In an ordinary conventional fishhook, as illustrated in FIG. 7, an spade-end 3' formed to be wider in size than a shank 2' around which a fishing line 5' is tied is provided at an end of the upper part (or the shank where the fishing line is tied: chimoto). That is, the fishing line 5' tied to the shank 2' is prevented from falling off of the upper part of the fishhook 1' by being stopped at the spade-end 3'.

However, when the wider spade-end 3' is present, a piece of bait 8' cannot go up to the end part on the chimoto side, and the fishhook 1' cannot be entirely hidden by the bait 8'. As a result, an exposed portion shines and the fish are wary, which is a defect. This type of fishhook also requires that the fishing line be tied with a snell knot (outside), a snell knot (inside), or the like, which is time-consuming for the unaccustomed. Moreover, the fishing line having been wound about the outer peripheral surface of the fishhook in this manner is sometimes gnawed and cut by the fish, which is a defect.

The fishhook disclosed in Patent Literature 1 below aims to resolve the foregoing problems. As illustrated in FIG. 8, a through-hole (hole) 14' is present on a shank 12', on the chimoto side of a fishhook 11', and a projection 17' forming a recess 16' is provided on both the left and right sides of an end part on the chimoto side. Because a gradual taper is formed on the chimoto side and there is no stepped part on the fishhook 11', a piece of bait 18' can be put thereon up to the end part on the hook eye side, and the fishhook 11' can be entirely hidden. Because the projection 17' is on both the left and right sides, the bait 18' can be hooked thereon and prevented from falling off. When a fishing line 15' is tied between the through-hole 14' and the recess 16', an advantage emerges in that the fishing line 15' can be prevented from being exposed on the outer peripheral surface of the shank 12' and from being gnawed at by the fish, and in that the bait 18' can be easily placed thereon as far as the end part on the chimoto side.

CITATION LIST

Patent Literature

[PTL 1] Japanese Patent Publication No. 3725756

SUMMARY OF INVENTION

Technical Problem

However, the fishhook 11' disclosed in Patent Literature 1 needs a long time for manufacture preparation (the time for producing the die) and is more likely to incur greater production costs because the tapered portion of the surface, the through-hole 14', the recess 16', and the like must be molded using a press die.

An object of the claimed invention is to provide a fishhook which allows for a piece of bait to be placed thereon up to an end part on the chimoto side without there being a wider spade-end, unlike described above, and which can be produced in a simpler and more inexpensive manner, and to provide a method for manufacturing the same.

Solution to Problem

In order to resolve the foregoing problems, the fishhook according to the present invention is characterized in that a shank is hit or ground to form a flat surface at an upper (hereinafter "up" refers to the end part on the chimoto side of the shank including the direction of the extended line thereof) side part thereof, and two holes (or a plurality of holes including the same) (through-holes) penetrating through the flat surface transverse to the shank part (perpendicular to the length direction of the shank part) are formed with a vertical interval therebetween, and a part of the shank is cut transversely across the upper hole of the two holes to thereby form, at the upper part of the shank, a hole through which a fishing line is passed and tied and two upward protrusions enabling a piece of bait to be engaged therewith and being capable of preventing the fastened fish line from being displaced from the upper part to the side part (outer peripheral surface) of the shank. The "side part" at the upper part of the shank where the flat surface is formed is a side surface portion of the shank; there is no limitation to the portion positioned on the left and right sides when the fishhook is viewed from the front.

A fishhook 1 illustrated in FIG. 1 is an example of a fishhook according to the present invention, on which a flat surface 3 is formed at the upper side part of a shank 2 and a hole 4b and two projections 7 are formed. In the fishhook 1 in FIG. 1, the flat surface 3 is formed substantially in parallel with the plane including the hook point or the curve of the so-called gap. However, as illustrated in FIG. 4, a flat surface 13 provided to the side part of a shank 12 may also be formed substantially perpendicular to the plane including the curve of the gap or the like (oriented the same as the example in FIG. 8).

When a fishhook is formed as described above, because there is no wider spade-end, it becomes possible to put the bait up to the end part of the shank, making it possible to cover the entirety of the fishhook with the bait. The following merits are also present because of the inclusion of the hole and the two upward projections at the upper part of the shank as described above:

The bait having been put thereon can be engaged with the projections and mounted so as to be less prone to fall off.

When the fishing line is passed through the hole from above the shank and tied between the two projections, the fishing line does not shift to the left or right because of the presence of the projections. Given that the fishing line does not shift to the left or right, the fishing line is not be exposed on the outer peripheral surface of the shank, and thus fish can be prevented from gnawing thereon and cutting the fishing line.

The fishing line having been tied to the hole from above the shank as described above does not swell out to the outer peripheral surface of the shank, and thus the putting of the bait can be performed in a more unencumbered manner.

Further, because this fishhook can be formed with normal working tools and without the use of a special press die, the time needed to prepare for manufacture can be shortened and the manufacture costs can be reduced. In particular, because the hole through which the fishing line is passed and tied and the two projections for engaging the bait and preventing the tied-on fishing line from shifting are formed simultaneously by a simple process in which the holes are formed and then the one hole is cut across, a significant effect is imparted in that the flow of fishhook manufacture is considerably shortened.

With the fishhook of the present invention, preferably, burrs (protruding edge parts during machining) are removed from the edge part of the hole and the end parts of the cut shank (the edge parts of the projection and the like) to round out the corners.

When the burrs generated during the cutting process are left untreated, the burrs may cut the fishing line. In particular, when a fish caught on the fishhook is reeled in, the fishing line is in strong contact with the edge of the hole and is more prone to being cut. However, when the burrs have been removed from the fishhook, such a defect can be eliminated.

In order to remove the burrs, one part or all of the fishhook, including the edge part of the opened hole and the end part of the cut shank, is preferably immersed in a chemical solution (a corrosive solution).

Immersing the fishhook in the chemical solution is intended to easily and uniformly remove the burrs generated by the hole-opening process or the cutting process. Also, because the burr removal of a plurality of fishhooks can be performed in a single step, the fishhook is further advantageous in terms of costs.

In order to remove the burrs, more preferably, one part or all of the fishhook may be immersed in the chemical solution after the edge part of the opened hole and the end part of the cut shank are chamfered.

In so doing, because the burrs are removed reliably and rapidly, the fishhook makes it possible to more reliably prevent the fishing line from being cut by the edge of the hole.

With respect to the burr removal, especially preferably, the edge part of the opened hole and the end part of the cut shank are chamfered, then the fishhook is hardened, and thereafter one part or all of the fishhook is immersed in the chemical solution.

When the edge part of the hole and the shank end part are chamfered before immersion in the chemical solution, the burr removal can be reliably and rapidly carried out as described above. Using the mechanical process of chamfering to rapidly deburr a certain amount or more and then immersing in the chemical solution is intended to remove burrs from the immersed portion so as to prevent any from remaining (from being left behind).

However, when the hardening is performed, depending on the material of the fishhook, the hardness thereof often changes considerably before and after hardening. In such a case, the chamfering is more efficient when performed before hardening, when the material of the fishhook is comparatively softer, and therefore it is advantageous to harden after chamfering. When the immersion in chemical solution is performed after hardening, the deburring overall can be performed in an especially unencumbered manner.

In a particularly preferred aspect of the fishhook of the present invention, the end part of the fishing line is passed, from above, through the hole through which the fishing line is to be passed and tied, and the end part is again lifted upward and then wound around the fishing line to thereby tie the fishing line without winding around the outer peripheral surface of the shank.

With the fishhook on which the fishing line is mounted in such a manner of tying, the fishing line does not swell out of the outer peripheral surface of the shank, and thus the bait can smoothly cover as far as the end part of the shank. The defect wherein the fishing line is gnawed on and cut by fish is also less prone to occur.

Methods for tying as above include a so-called clinch knot, uni knot, or the like (such as a so-called figure-eight knot), and these may be employed for the fishhook of the present invention.

These methods of tying are suitable for not allowing the fishing line to swell out of the outer peripheral surface of the shank and are favorable in that any one thereof can be easily and simply performed and also there is less variance in the bond strength. A so-called snell knot (outside) or snell knot (inside) has the fishing line wound around the outer peripheral surface of the shank part of the fishhook and does thus not impart the above-described effect.

A method for manufacturing the fishhook according to the present invention is characterized in that a shank is hit or ground to form a flat surface at an upper side part, then two holes penetrating through the flat surface are formed with a vertical interval therebetween, and a part of the shank is cut transversely across the upper hole of the two holes to thereby form, at the upper part of the shank, a hole through which a fishing line is passed and tied and two upward protrusions enabling a piece of bait to be engaged therewith and being capable of preventing the fastened fish line from being displaced from the upper part of the shank.

According to the method of production of such description, the aforedescribed fishhook can be suitably produced. Moreover, since the characteristic portions of the fishhook can be formed merely with ordinarily working tools and without the use of a special press die, the time needed for manufacture can be shortened and production costs can be reduced. In particular, because the hole through which the fishing line is passed and tied and the two projections for engaging the bait and preventing the tied-on fishing line from shifting are formed simultaneously by a simple process in which the holes are formed and the one hole is cut across, the flow of fishhook manufacture is considerably shortened and simple and efficient production is possible.

With respect to the foregoing method of production, one part or all of the fishhook may be immersed in a chemical solution to thereby remove burrs from the edge part of the opened hole and from the end part of the cut shank.

In so doing, the task of removing the burrs that occur during the hole-opening or cutting work can be carried out in a simple process at once for a plurality of fishhooks. For this reason, it is possible to inexpensively produce high-quality fishhooks where the fishing line is less prone to being cut. The edge part of the opened hole during machining may also be chamfered prior to the immersion of the fishhook in the chemical solution. In so doing, it is possible to more efficiently produce the fishhook where the fishing line is less prone to being cut.

For the burr removal, especially preferably, the edge part of the opened hole and the end part of the cut shank are chamfered, then the fishhook is hardened, and thereafter one part or all of the fishhook is immersed in the chemical solution.

In so doing, the mechanical process of chamfering and the chemical treatment by the solution make it possible to reliably and rapidly remove burrs. Since the chamfering is performed prior to hardening, it can be performed unencumbered, before the hardness of the edge part and the like has increased, and the task of burr removal overall can be rendered considerably more efficient.

Advantageous Effects of Invention

According to the fishhook and the method for manufacturing the same according to the present invention, effects emerge in that a) a piece of bait can be put on up to the end part of the shank and can cover the entirety of the fishhook with the bait, b) the put-on bait can engage with the projection on the end of the shank and mounted so as to be less prone to fall off, c) the fishing line can be tied to the upper part of the shank and thus prevented from shifting to the left and right (to the side surface of the shank), therefore preventing the same from being cut by fish, d) the bait can be put unencumbered on the shank, and e) the upper part of the shank can be formed in an unencumbered and efficient manner and the production time and costs for the fishhook can both be reduced.

BRIEF DESCRIPTION OF DRAWINGS

FIG. 2 A flow chart illustrating a method for manufacturing the fishhook 1;

FIGS. 5(a) to 5(e) are drawings illustrating the procedure when a fishing line 5 is tied to the fishhook 1 with a clinch knot;

FIGS. 6(a) to 6(d) are drawings illustrating the procedure when a fishing line 5 is tied to the fishhook 1 with a uni knot;

DESCRIPTION OF EMBODIMENTS

What follows is a description of one mode for carrying out an embodiment according to the present invention, with reference to the accompanying drawings.

Figure 1A:
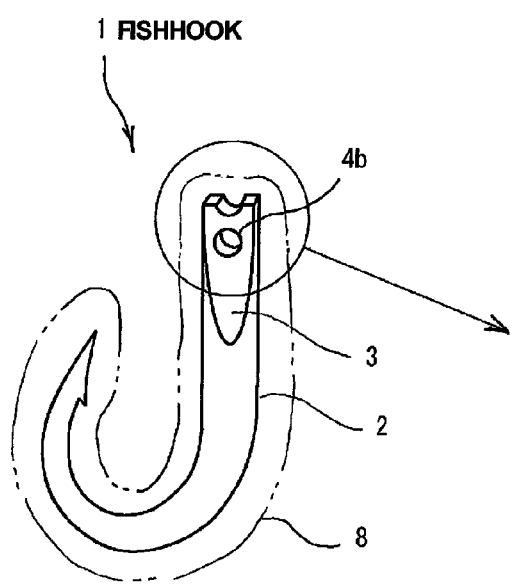
FIG. 1(a) is an overall perspective view of a fishhook 1 illustrating an embodiment of the present invention.
Figure 1B:
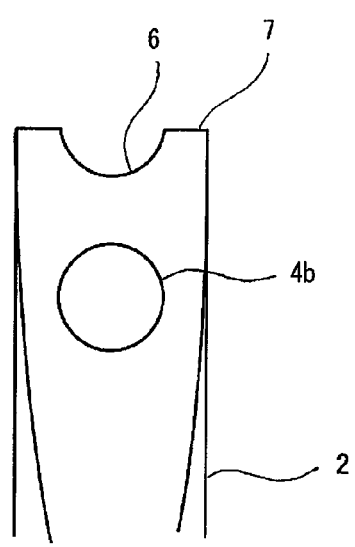
FIG. 1(b) is an enlarged side view illustrating an upper part of a shank 2.
Figure 7:
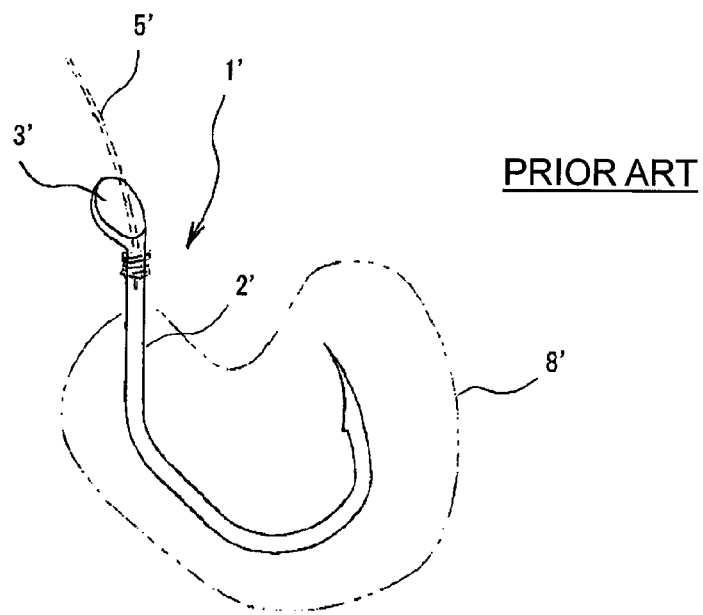
FIG. 7 A perspective view illustrating a conventional fishhook 1' in a state where a fishing line 5' is tied to a shank 2' with a snell knot (outside)

A fishhook 1 illustrated in FIG. 1 is given the following shape. A penetrating hole 4b for tying a fishing line is provided to a flat surface 3 formed at an upper part of a shank 2. The flat surface 3, unlike the conventional wider spade-end (for example, reference numeral 3' in FIG. 7), is formed in a shape that widens toward the end of the shank 2 at two points apart by 180° on a side surface of the shank 2. The portion between the two flat surfaces 3 forms a taper of a thickness that gradually reduces as going upward. An arc-shaped recess 6 and a projection 7 protruding upward on the both left and right sides thereof are formed at an upper end part of the shank 2.

Figure 3A:
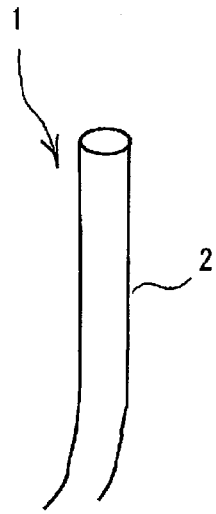
FIGS. 3(a) to (d) are perspective views sequentially illustrating the upper part shape of the shank of the fishhook 1 along the steps of production.
Figure 3B:
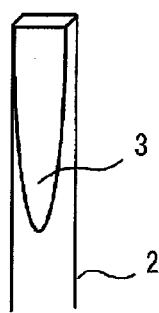

The fishhook 1 is produced in accordance with the process of steps 1 to 6 illustrated in FIG. 2. Namely, Step 1: An upper part of the shank 2 of the fishhook 1 illustrated in FIG. 3(a) is hit with a press machine or the like to form the flat surface 3 as in FIG. 3(b). The flat surface 3 is formed in a gradual taper toward the end of the shank 2, so as to prevent the creation of a step on the side surface of the shank 2. The flat surface 3 may also be formed by being ground with a file, whetstone, or the like, instead of being formed by being hit.

Figure 3C:
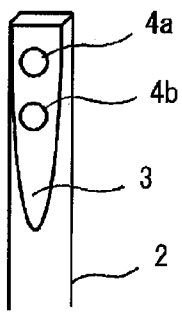

Step 2: As in FIG. 3(c), two holes 4a and 4b penetrating through the flat surface 3 are opened with a vertical interval therebetween. Though not illustrated, there may also be more than two holes formed.

Figure 3D:
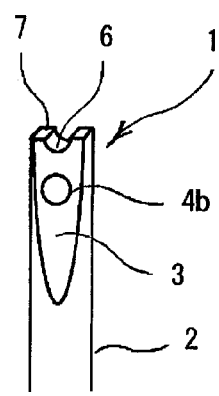

Step 3: As per FIG. 3(c) and FIG. 3(d), the shank 2 is cut transversely across the upper hole 4a in the vicinity of the middle thereof, and the vicinity of the upper end portion thereof is removed. In a case where there are more than two of the holes, the shank 2 is cut with at least one hole remaining below, and some are removed. The steps thus far, as illustrated in FIG. 3(d), form, at an upper part of the shank 2 of the fishhook 1, the hole 4b for tying the fishing line 5, as well as the arc shaped recess 6 and the projection 7 protruding upward on the both left and right sides thereof.

Step 4: The edge parts of both the hole 4b and the recess 6 are chamfered. The purpose is to prevent the fishing line 5 from being cut by the strong contact against these edge parts when tension is applied to the fishing line 5 tied to the hole 4b and the recess 6.

Step 5: After the foregoing steps, the fishhook 1 is hardened and then immersed in a corrosive solution (a chemical solution). The treatments in steps 4 and 5 remove burring (not shown) created at the edge parts of the hole 4b or the recess 6 or at the cut part of the shank 2 or elsewhere; thus, the fishing line 5 can be more reliably prevented from being cut. Step 4 could be omitted, depending on the type of the corrosive solution, on the immersion time therein, and the like.

Step 6: After the burring is removed, the fishhook 1 is plated. Nickel plating, tin plating, zinc plating, and the like improve corrosion resistance and prevent the occurrence of rust caused by seawater or the like. As needed, coating with a resin coating or the like is also performed.

Figure 4:
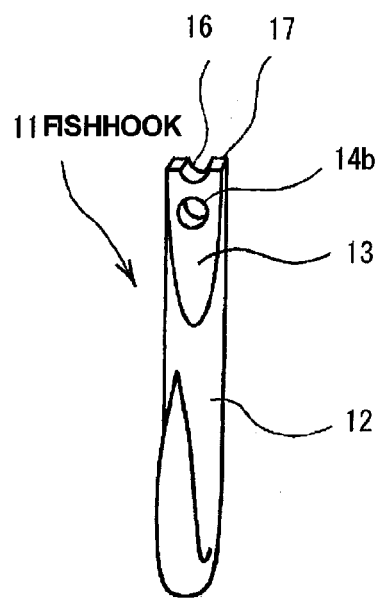
FIG. 4 An overall perspective view of a fishhook 11 illustrating another embodiment of the present invention.

The foregoing describes the steps for manufacturing the fishhook 1 in FIG. 1, and the procedure is similar also for manufacturing a fishhook 11 where the orientation of a flat surface 13 differs by 90° from that of the fishhook 1 in FIG. 1, as illustrated in FIG. 4. Namely, a shank 12 on which a gap, a hook point, a barb, or the like is formed is treated as per steps 1 to 6 above. As per the illustrating in FIG. 4, the flat surface 13 is formed at the upper part of the shank 12 in a substantially perpendicular orientation to the plane including the curve of the gap, and a hole 14b or the like is formed so as to penetrate perpendicularly to the flat surface 13. The position and shape of a recess 16 or projection 17 relative to the flat surface 13 and hole 14b are the same as with the fishhook 1 in FIG. 1.

It will be readily understood that the fishhook 1 completed through steps 1 to 6 is used with a fishing line tied thereon. The following is an introduction of one mode for tying the fishing line 5 (snell) to the fishhook 1, on the basis of FIG. 5 (the same may also be true for tying the fishing line to the fishhook 11 in FIG. 4). FIG. 5 illustrates the manner of tying, called a clinch knot.

Firstly, an end portion 5a of the fishing line 5 is passed through the hole 4b (FIG. 5(a)) from above the shank 2 of the fishhook 1, and is again lifted upward (FIG. 5(b)). Secondly, the end portion 5a is wound several times around the fishing line 5 extending to the opposite side of the hole 4b (FIG. 5(c)), and thereafter driven through a portion 5b of a wheel made at the lowermost part (FIG. 5(d)); a knot 5c is then drawn so as to be tight against the recess 6 at the end of the shank 2 (FIG. 5(e)). The end portion 5a at the tip from the knot 5c is cut to a suitable length. In FIG. 5(d), the end portion 5a after having been passed through the wheel portion 5b may be drawn after further having been passed through the middle of a wheel made atop the wheel portion 5b. Upon being drawn, preferably, the fishing line 5 is tightened after being moistened with saliva or the like.

When tying is performed in this manner, the fishing line 5 is tied between the hole 4b and the recess 6, and does not swell out of the outer peripheral surface of the shank 2. As such, the bait 8 can be put smoothly up to the upper end of the shank 2 as illustrated in FIG. 1, thus covering the entirety of the fishhook 1 therewith. Because the projection 7 is formed on both sides at the upper end of the shank 2, the bait 8 can be engaged therewith. Further, because the projections 7 are on both sides, the fishing line 5 on the recess 6 is less prone to shift to the left or right, and in even a case when a fish caught on the fishhook 1 moves agitatedly, the fishing line 5 does not fall off of the recess 6.

Moreover, because the edge part of the hole 4b and the like and the edge parts of the recess 6 and the projections 7 have been chamfered and the burrs on the edge parts or on the recess 6 or projection 7 have been removed with corrosive solution, the fishing line 5 is less likely to be cut by contact with the hole 4b, the recess 6, or the projection 7.

Figure 8:
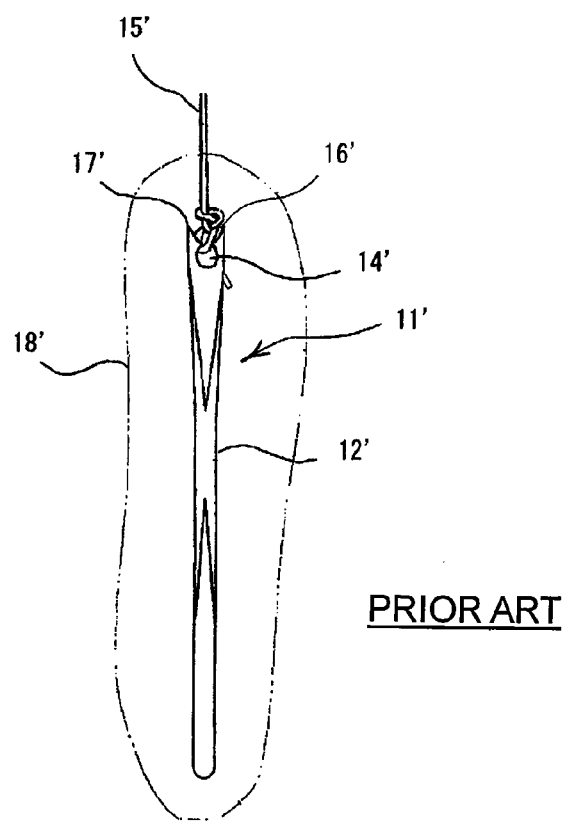
FIG. 8 A front view illustrating a convention fishhook 11'.

FIG. 5 introduces a clinch knot as a preferred example of the method of tying, but any other method of tying, such as a uni knot or a FIG. 8 knot, may be employed provided that the method of tying prevents the fishing line from swelling out of the outer peripheral surface of the shank.

FIG. 6 illustrates the manner in which the fishing line is tied with a uni knot. The case with the uni knot is as follows. Firstly, the end 5a of the fishing line 5 (the snell) is passed through the hole 4b of the fishhook 1, and the end 5a is folded over to make a wheel 5b (FIG. 6(*a*)). The winding is done twice in such a manner that the end 5a is passed through the wheel 5b thus made (FIG. 6(*b*)), and after the fishing line 5 is moistened with saliva or the like, the end 5a is pulled to lightly tighten the knot (FIG. 6(*c*)). Finally, the main line of the fishing line 5 is pulled and the knot is fastened (FIG. 6(*d*)). The fishing line can be tied in a similar manner for both the fishhook 1 in FIG. 1 and the fishhook 11 in FIG. 4.

In FIG. 3(*d*), the shank 2 is cut transversely at the vicinity of the middle of the upper hole 4a, but provided that the hole 4a is traversed, the shank 2 may also be cut at a position higher than the vicinity of the middle thereof. In so doing, the height of the projection 7 relative to the recess 6 is increased and the fishing line is even less prone to shift to the left or right, and thus the top side of the projection 7 and the curve of the recess 6 together form a sharp corner part; therefore, an advantage emerges in that the bait can be mounted thereon so as to be even less prone to fall off.

INDUSTRIAL APPLICABILITY

The fishhook and the method for manufacturing the same according to the present invention can be advantageously used on an industrial scale in the field of fishhook production techniques.

REFERENCE SIGNS LIST

1, 11 Fishhook
2, 12 Shank
3, 13 Flat surface
4 (4a, 4b), 14b Hole
5 Fishing line
6, 16 Recess
7, 17 Projection
8 Bait

The invention claimed is:

1. A method for manufacturing a fishhook, wherein a shank is hit or ground to form a flat surface at an upper side part, then two holes penetrating through the flat surface are formed with a vertical interval therebetween, and a part of the shank is cut transversely across the upper hole of the two holes to thereby form, at the upper part of the shank, a hole through which a fishing line is passed and tied and two upward protrusions enabling a piece of bait to be engaged therewith and being capable of preventing the fastened fish line from being displaced from the upper part of the shank.

2. The method for manufacturing a fishhook according to claim 1, wherein one part or all of the fishhook including the edge part of the opened hole and the end part of the cut shank is immersed in a corrosive solution to thereby remove burrs from the edge part of the opened hole and from the end part of the cut shank.

3. The method for manufacturing a fishhook according to claim 2, wherein the edge part of the opened hole and the end part of the cut shank are chamfered, then the fishhook is hardened, and thereafter one part or all of the fishhook is immersed in a corrosive solution to thereby remove the burrs.

* * * * *